United States Patent
König

[11] Patent Number: 5,772,376
[45] Date of Patent: Jun. 30, 1998

[54] COUNTERSUNK HEAD SCREW

[75] Inventor: Gottfried König, Bad Laasphe, Germany

[73] Assignee: Ejot Verbindungstechnik GmbH & Co. KG, Bad Laasphe, Germany

[21] Appl. No.: 776,732
[22] PCT Filed: May 22, 1996
[86] PCT No.: PCT/EP96/02203
   § 371 Date: May 15, 1997
   § 102(e) Date: May 15, 1997
[87] PCT Pub. No.: WO96/38676
   PCT Pub. Date: Dec. 5, 1996

[30] Foreign Application Priority Data

May 29, 1995 [DE] Germany .................. 295 08 852.4

[51] Int. Cl.$^6$ .............................. F16B 23/00; F16B 35/06
[52] U.S. Cl. ............................. 411/399; 411/188
[58] Field of Search ................... 411/378, 399, 411/187, 188, 424

[56] References Cited

U.S. PATENT DOCUMENTS

| 1,151,861 | 8/1915 | Brumback ........................... 411/399 |
| 4,655,661 | 4/1987 | Brandt ................................ 411/399 X |
| 5,199,839 | 4/1993 | DeHaitre ........................... 411/399 X |

FOREIGN PATENT DOCUMENTS

| 2089805 | 3/1990 | Japan .................................. 411/399 |
| 113183 | 2/1918 | United Kingdom ................. 411/399 |

*Primary Examiner*—Neill R. Wilson
*Attorney, Agent, or Firm*—Frahwitter Patent- und Rechtsanwölte

[57] ABSTRACT

The invention relates to a countersunk head screw with an even number of ribs with countersinking blades on the underside of the screw head and projecting therefrom. Every other rib has a step at its end towards the screw shaft formed by shortening the rib concerned in relation to each adjacent rib.

14 Claims, 2 Drawing Sheets

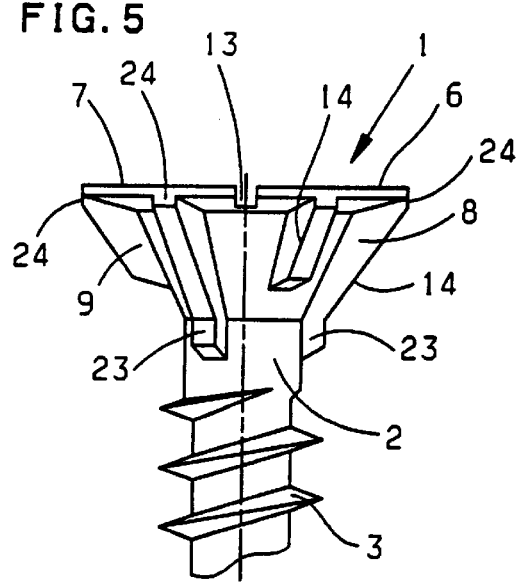
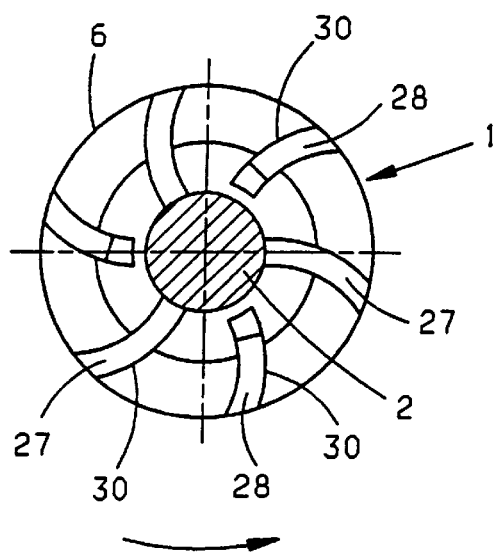
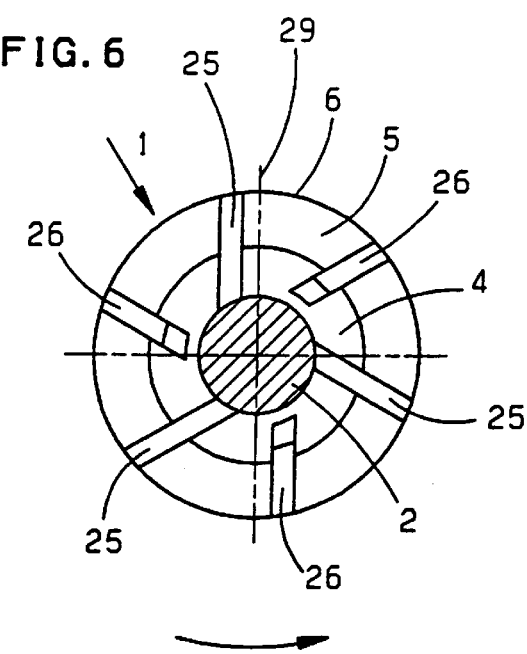
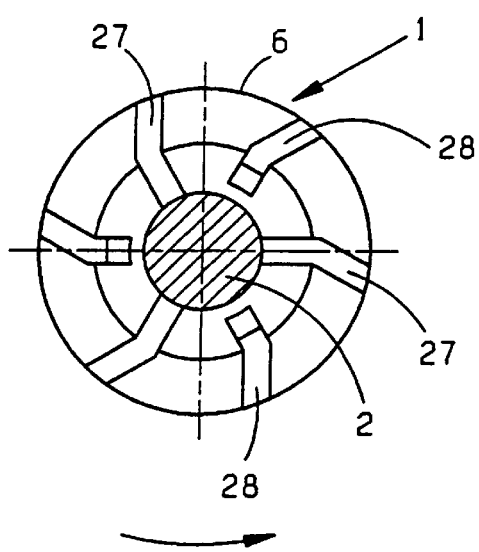

COUNTERSUNK HEAD SCREW

BACKGROUND OF THE INVENTION

The invention relates to a countersunk head screw having ribs which are arranged on the conical underside of its screw head, project relative to the underside, are present in an even number and have countersinking cutting edges.

Such a countersunk head screw is able by means of its ribs to cut free the countersink in a workpiece for the countersunk head of the screw. German Utility Model 92 02 650 and German Offenlegungsschrift 33 34 212, for example, disclose such countersunk head screws. A common feature of both countersunk head screws is that they have an even number of radial ribs identical to one another, the important factor according to the former publication being to provide a larger number of ribs, namely more than 8. This is intended to permit good distribution of the screwing forces over the countersinking cutting edges formed by the ribs. In the latter publication, it is a matter of configuring the ribs like a milling cutter. In both countersunk screws, all the ribs extend from the outer rim of the screw head to the screw shank.

Such countersunk screws are a mass product which is manufactured with tools which must have a long tool life. In this case, the cold forming of the underside of the screw head is effected by an embossing operation. The configuration of the underside of the screw head has to allow for this, since the embossing tool forms the negative image of the underside of the screw head and accordingly has to be designed with prominences and recesses, which then cause the material of the screw head to flow during the cold forming and in the process are subjected to high loads.

SUMMARY OF THE INVENTION

The object of the invention is to configure the countersunk head screw with regard to the conical underside of its screw head in such a way that, while achieving a good cutting action on the workpiece to be fastened and a favorable chip flow, the ribs have a configuration which permit a robust, rigid design for the embossing tool. According to the invention, this is achieved in that the ribs are present in an even number, of which every second rib, at its end facing the screw shank, has a step which is formed by shortening the relevant rib relative to the adjacent ribs.

On account of the shortening in each case of the second rib, a rib configuration is obtained in which a clearance space results between two unshortened ribs, which clearance space is formed by the latter and the step of the shortened rib and is relatively large in the area where the rib ends facing the screw shank run toward one another so that the ends of the ribs would come very close to one another there if every second rib were not shortened. A correspondingly large projection of the embossing tool can project into this relatively large clearance space; that is, the embossing tool has no especially narrow projections which tend to break away under prolonged loading. However, the rib configuration according to the invention not only makes it easier to design the embossing tool in such a way as to ensure a long tool life, it also enables chips to collect in the clearance spaces when screwing the countersunk head screw into a workpiece, which chips would otherwise have to escape or could exert an undesirable pressure on the material of the workpiece on account of their volume.

The length of the relevant rib following the step is expediently selected in such a way that this length corresponds to about ⅔ of the length of the adjacent ribs. At this length, the shortened rib, in its outer area, is in particular able to participate fully in the cutting of the material of the workpiece when the countersunk head screw is being screwed in and can remove the material cut in this area together with the chips arriving from the inside, while in the radially inner area the material cut there can largely remain in the abovementioned clearance spaces so that a substantially smaller volume of chips is to be conveyed away in this area.

The countersunk head screw dealt with here is often used to screw a plate forming the workpiece to any support. If the plate in this case is thicker than the screw head of the countersunk head screw, it is expedient to lengthen the unshortened ribs right into the area of the screw shank until they extend right into the end of the screw shank; that is, they also provide a cutting action on the material in the area of the screw shank for widening the through-hole for the screw. If, on the other hand, the plate is only as thick as or is thinner than the screw head, it is sufficient for the unshortened ribs, with their end turned away from the screw head, to merge into the conical underside of the latter or to end in the transition between screw shank and conical underside. In this case, the screw head performs a cutting action in the workpiece, which cutting action involves the entire screw head, in which case the screw-shank end attached to the screw head then projects directly from the plate and merges into the support for the plate.

There are various possibilities for the extension of the ribs. First of all, the ribs may be made to run radially. A rectilinearly radial course of the ribs facilitates the manufacture of the forming tool for the cold forming. However, it is also possible, while retaining the linearity of the ribs, to arrange the latter in each case in an offset manner essentially parallel to their center line. If this is done in the screw-in direction, the conveying action of the ribs on the chips can thus be improved.

A similar effect is achieved when the ribs form a concave cutting edge in the screw-in direction. Apart from a rounded construction, the ribs may also be configured for this purpose from two rectilinear parts adjoining one another via a bend.

In particular if the relevant workpiece is made of a friable material, it may be useful to deliberately not remove the chips but to press them into the material of the workpiece in order to compress the material in the area of the screw head. To this end, the ribs are given a concave shape in the screw-in direction of the screw. If the abovementioned ribs offset in parallel are used, these ribs may be offset in the opposite direction to the screw-in direction so that the chips are conveyed radially to the inside by the ribs.

Depending on whether it is desired to cut more or less material below the screw head, the outer surfaces of the ribs may be configured accordingly. These outer surfaces may be made to run rectilinearly, in which case less material is cut than if the outer surfaces of the ribs are made to run in an arched manner. In this case, an increased cutting action results.

If it is desired to sink the screw head deeper relative to the relevant outer surface of the workpiece, the screw head may be provided with an essentially cylindrical rim which continues over the relevant ends of the ribs. In this case, a cylindrical runout of the conical countersink is cut by the ends of the ribs, into which runout the screw head can settle and thus if need be lies deeper with its outer surface than the surface of the corresponding workpiece.

BRIEF DESCRIPTION OF THE DRAWINGS

Exemplary embodiments of the invention are shown in the figures, in which:

FIG. 5 shows a side view of the countersunk head screw having ribs lengthened parallel to the screw shank, FIG. 6 shows a section similar to that according to FIG. 2 having offset ribs, FIG. 7 shows a section similar to that according to FIG. 2 having curved ribs, FIG. 8 shows a section similar to that according to FIG. 2 having bent ribs.

DETAILED DESCRIPTION OF THE INVENTION

Figure 1:
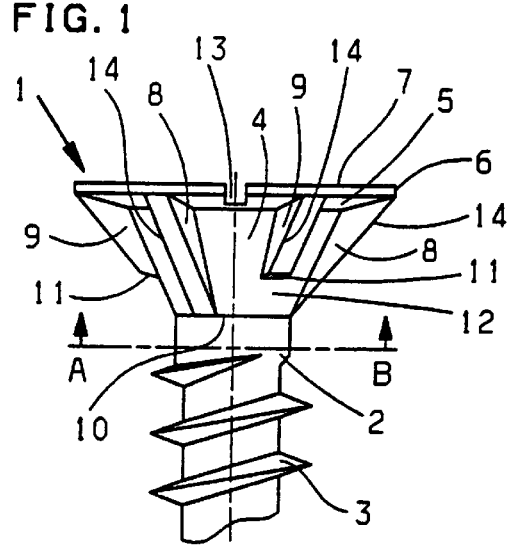
FIG. 1 shows a countersunk head screw in side view.

FIG. 1 shows the side view of a countersunk head screw with the screw head 1, adjoining which is the screw shank 2 with the thread 3. The screw head 1 has a conical underside having the cone 4 adjoining the screw shank 2 and the following cone 5, the latter merging into the cylindrical rim 6 on the top side 7 of the screw head. Attached to the underside of the screw head 1 are a plurality of ribs 8 and 9, specifically three longer ribs 8 and three shorter ribs 9, as apparent from FIG. 2 explained further below. The ribs 8 and 9 are embossed from the material of the screw head 1 by cold forming. The ribs 8 extend from the rim 6 to the edge 10, at which the cone 4 adjoins the screw shank 2.

On their side facing the screw shank 2, the shorter ribs 9 end in the step 11, which defines the length of the ribs 9. On account of the presence of this step 11, a clearance space 12 (also see FIG. 2) is obtained between the two adjacent ribs 8, which clearance space 12 has a favorable effect on the configuration of the forming tool embossing the screw head 1, since this forming tool forms the negative image of the underside of the screw head 1. In this negative image, projections are to be provided on the forming tool in order to shape the intermediate spaces between the ribs 8 and 9, of which in each case the projections of the forming tool which are present laterally next to a shorter rib 9 are connected via a bridge, filling the clearance space 12, in the forming tool. The forming tool is thereby given high stability and thus also a correspondingly long tool life. The length of the shorter ribs 9 corresponds to about ⅔ of the length of the adjacent longer ribs 8. It may also be pointed out that, as FIG. 1 shows, the screw head 1 is provided with the slot 13 for a screwdriver with blade. Instead of the slot 13, any other tool receptacle, e.g. a cross recess, may of course also be used.

Figure 2:
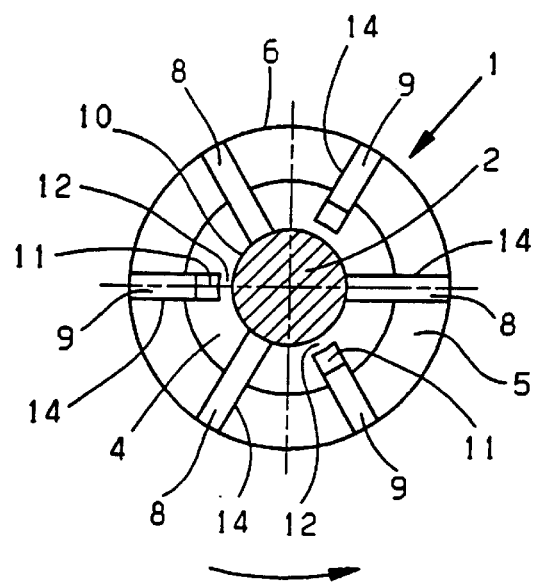
FIG. 2 shows the same countersunk head screw in a section along line A-B in FIG. 1.

FIG. 2 shows a section along line A-B in FIG. 1; it therefore shows the underside of the screw head 1 having the symmetrically arranged shorter ribs 9 and the longer ribs 8, which in each case are arranged offset from one another by the same angle. In this case, the longer ribs 8 extend from the rim 6 to the edge 10, at which the cone 4 merges into the screw shank 2. On their side facing the screw shank 2, the shorter ribs 9 end in the steps 11, which here, as also shown by FIG. 1, are slightly bevelled in order to facilitate the flow of the material of the screw head 1 during the cold forming.

When the countersunk head screw shown in FIGS. 1 and 2 is being screwed in according to the arrow direction shown in FIG. 2, the front countersinking cutting edges 14 of the ribs 8 and 9 cut material out of the workpiece, as otherwise necessary by means of a countersink bit. The screw head 1 therefore assumes the role of a countersink bit. The chips cut out of the material of the relevant workpiece by the countersinking cutting edges 14 can escape in the radial direction next to the ribs 8 and 9; however, they can also collect in the clearance spaces 12 in front of the steps 11, in the course of which they utilize the clearance space 12 present here.

Figure 3:
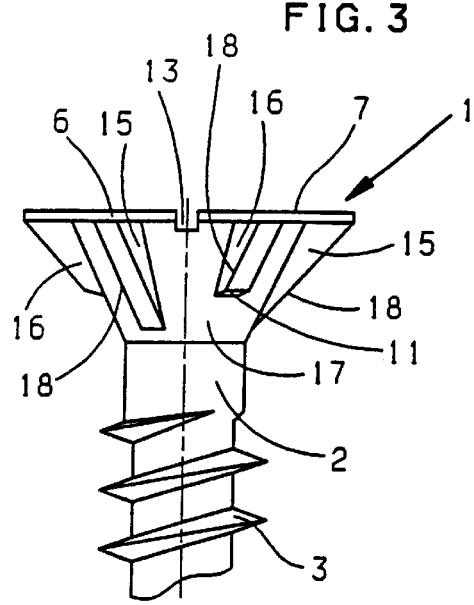
FIG. 3 shows a side view of a countersunk head screw having rib ends merging into the conical underside of the screw head.

FIG. 3 shows the side view of a countersunk head screw having a screw head 1 whose unshortened ribs 15 merge at their end facing the screw shank 2 into the underside of the screw head 1, which is formed here by the single cone 17. This is therefore an embodiment in which, with the screwing-in of the countersunk head screw, the countersinking cutting edges 18 of the screw head only come into contact with the relevant workpiece when the cone 17 has been pressed a short distance into the material of the relevant workpiece. This is of advantage when the relevant workpiece into which the screw head is to be sunk is made of a relatively thin plate.

Figure 4:
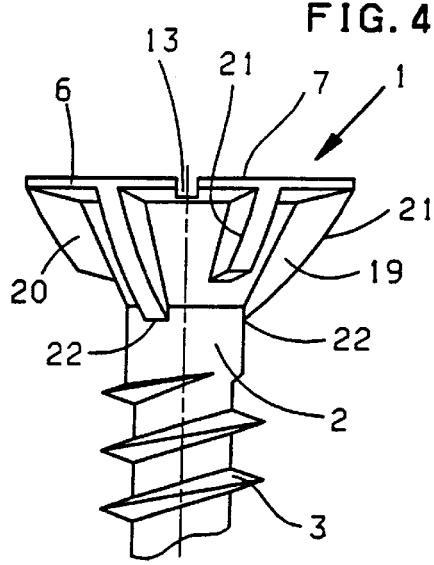
FIG. 4 shows a side view of a countersunk head screw having ribs extending right into the end of the screw shank.

A further embodiment of a countersunk head screw is shown in side view in FIG. 4, in which the outer surfaces with their countersinking cutting edges 21 of the ribs 19 and 20 run in an arched manner to the outside. In this way, slightly more material is cut out of the relevant workpiece than is actually necessary for a countersink, a factor which is of advantage when the screw head 1 is to be sunk slightly right below the surface of the relevant workpiece. Here, the unshortened ribs 20 run from the rim 6 right into the area of the screw shank 2, their relevant end 22 running a short distance over the screw shank 2.

A modification of the configuration according to FIG. 4 is shown in FIG. 5, in which the end 23 overlapping the screw shank 2 runs parallel to the screw shank 2; that is, a cylindrical bore is cut out of the material of the relevant workpiece in the area of the end 23, the diameter of which bore corresponds approximately to the diameter of the thread 3 so that a through-hole for the thread 3 is thus obtained in the relevant workpiece. Here, the cylindrical rim 6 of the screw head 1 is at the same time the boundary 24 for the relevant ends of the ribs 8 and 9. These ends lie with their boundaries 24 in a cylindrical envelope which conforms to the cylinder forming the rim 6. On account of this configuration of the ribs 8 and 9, a corresponding cylindrical recess is cut into a workpiece when the screw head is being screwed in, into which recess the screw head settles, whereby its top side 7 is correspondingly sunk relative to the surface of the relevant workpiece.

A screw head 1 similar to the representation according to FIG. 2 is shown in FIG. 6, in which unshortened ribs 25 and shortened ribs 26 in each case run offset essentially parallel to a vertical center line 29. On account of this arrangement of the ribs 25 and 26, the chips flowing between the ribs tend to be conveyed to the outside when the screw head 1 is screwed into a workpiece in the arrow direction shown.

A similar configuration is shown in FIG. 7, in which the ribs 27 and 28 run convexely with their counter-sinking cutting edges 30, taking the screw-in direction indicated by the arrow direction as a basis, and thus tend to direct the chips lying between the ribs 27 and 28 away to the outside.

A modification of the configuration according to FIG. 7 is shown in FIG. 8, in which the ribs 27 and 28 are provided with a bend, which is of advantage for constructing the relevant forming tool.

It may also be pointed out that the ribs 27 and 28 according to FIGS. 7 and 8 may be of concave configuration, resulting in the effect that the chip material cut out by them is compressed to the inside, that is, it is not conveyed to the outside, a factor which may be of advantage for various applications, in particular if the material of the workpiece is friable.

I claim:

1. A countersunk head screw having ribs which are arranged on the conical underside of its screw head, project relative to the underside, are present in an even number and have countersinking cutting edges, wherein every second rib, at its end facing the screw shank, has a step which is formed by shortening said every second rib relative to the adjacent ribs.

2. The countersunk head screw as claimed in claim 1, wherein a length of said every second rib corresponds to about ⅔ of the length of the adjacent ribs.

3. The countersunk head screw as claimed in claim 1 or 2, wherein the unshortened ribs are lengthened right into the area of the screw shank.

4. The countersunk head screw as claimed in claim 3, wherein the unshortened ribs, with their end turned away from the screw head, merge into the conical underside of the latter.

5. The countersunk head screw as claimed in claim 3, wherein the unshortened ribs, with their end turned away from the screw head, end in the transition between screw shank and conical underside.

6. The countersunk head screw as claimed in claim 3, wherein the ribs extend right into the end of the screw shank.

7. The countersunk head screw as claimed in claim 6, wherein the ribs, in their area of extension at the end of the screw shank, run parallel to the screw shank.

8. The countersunk head screw as claimed in claim 1, wherein the ribs run radially.

9. The countersunk head screw as claimed in claim 1, wherein the ribs in each case run in an offset manner essentially parallel to a vertical center line.

10. The countersunk head screw as claimed in claim 1, wherein the ribs form a concave or convex countersinking cutting edge in the screw-in direction of the screw.

11. The countersunk head screw as claimed in claim 10, wherein the ribs consist of two rectilinear parts adjoining via a bend.

12. The countersunk head screw as claimed in claim 1, wherein the outer surfaces of the ribs run rectilinearly.

13. The countersunk head screw as claimed in claim 1, wherein the outer surfaces of the ribs run in an arched manner to the outside.

14. The countersunk head screw as claimed in claim 1, wherein the screw head has an essentially cylindrical rim which continues over the relevant ends of the ribs.

* * * * *